Oct. 31, 1950          H. D. ENGLER          2,528,046
HYDRAULICALLY OPERATED LAND SCRAPER

Filed July 13, 1948          3 Sheets-Sheet 1

INVENTOR.
Hermon D. Engler
BY Victor J. Evans & Co.
ATTORNEYS

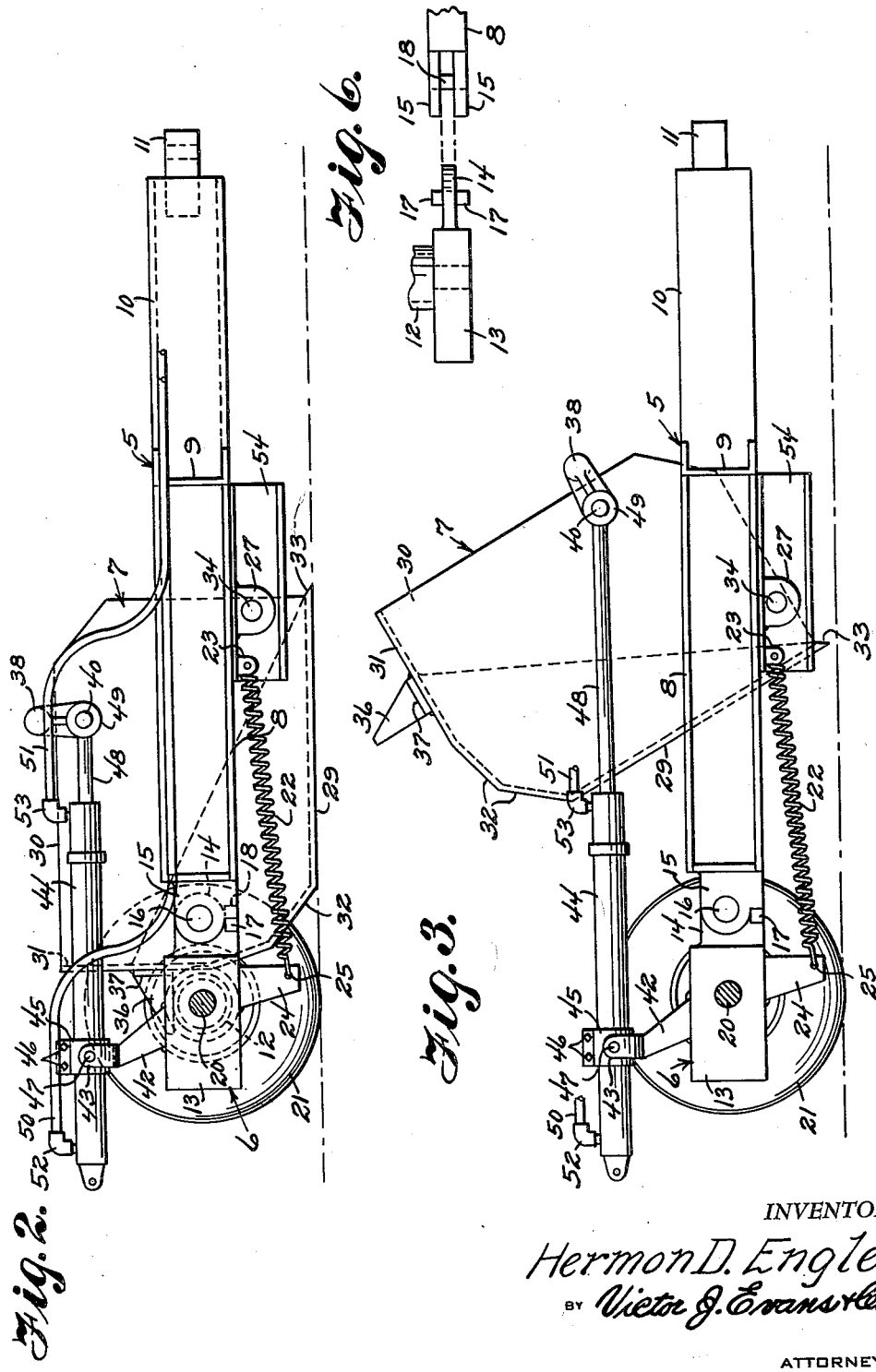

Oct. 31, 1950 H. D. ENGLER 2,528,046
HYDRAULICALLY OPERATED LAND SCRAPER
Filed July 13, 1948 3 Sheets-Sheet 3
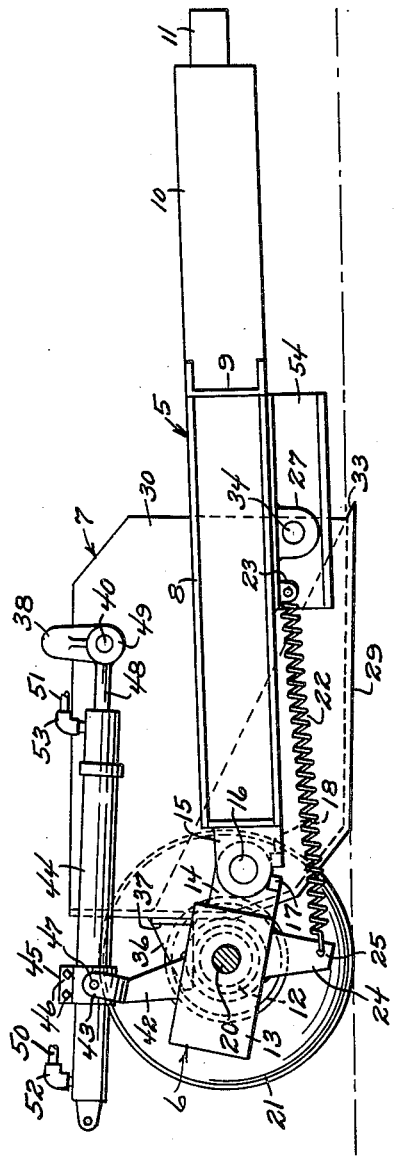
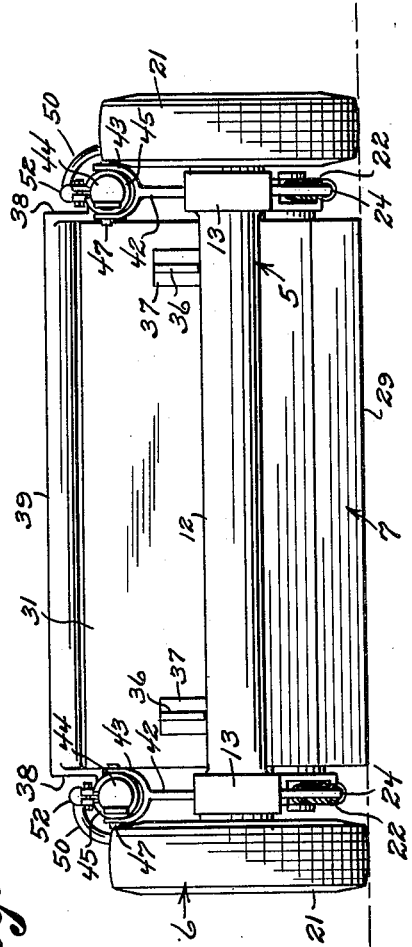
INVENTOR.
Hermon D. Engler
BY Victor J. Evans & Co.
ATTORNEYS Patented Oct. 31, 1950

2,528,046

UNITED STATES PATENT OFFICE 2,528,046

HYDRAULICALLY OPERATED LAND SCRAPER

Hermon D. Engler, Hatch, N. Mex.

Application July 13, 1948, Serial No. 38,381

1 Claim. (Cl. 37—129)

The present invention relates to improvements in land scrapers, and in particular to a land scraper in which the scraper bucket is rocked from an operative position to a dumping position by hydraulic control mechanism.

The primary object of the invention resides in providing a land scraper in which the position of the scraping blade and bucket can be conveniently controlled from a position adjacent the seat of the tractor vehicle by the operator.

Another object is to provide a land surface scraper with a frame structure having a breakjoint capable of being hydraulically operated so that the frame structure will be lowered slightly to position the edge of the scraper at the proper rake angle with respect to the land surface.

Another object of the invention is to provide a land surface scraper which can be conveniently dumped or unloaded by operation of suitable controls adjacent the driver's seat of a tractor vehicle.

Another object is to provide a land surface scraper which is hydraulically operated and is under control of the hydraulic operating mechanism to position the scraper bucket at various predetermined positions.

Another object of the invention is to provide a hydraulically operated land scraper which will move large loads of dirt and soil with the expenditure of very little energy, and which can be operated successfully with a conventional tractor vehicle.

Another object is to provide a land surface scraper in which the bucket is rockably mounted on a frame structure and operated by double acting hydraulic pistons reciprocably mounted in suitable cylinders supported on the frame structure so that the land scraper bucket can be adjusted to any desired position and retained in said predetermined position during operation of the land scraper.

Another object is to provide a land surface scraper in which the scraper bucket is operatively positioned by admitting pressure fluid to one end of the cylinder to cause the piston therein to move inwardly of said cylinder, whereby said breakjoint will rock in one direction and cause the nose of the bucket to be lowered slightly.

Another object of the invention resides in the provision of a land scraper or the like in which the scraper bucket is provided with a pair of stop members on its rear portion which are adapted to engage the frame supporting axle and limit downward movement of the rear end of said scraper bucket.

Other objects and advantages of the invention will become apparent during the course of the following description of the accompanying drawings wherein:

Figure 2 is a side elevational view of the land scraper with one wheel removed showing the bucket in a neutral position with the nose thereof on the same level as the rear edge surface of the bucket.

Figure 3 is a side elevational view of the land scraper with one wheel removed showing the bucket elevated to a full load dumping position with the hydraulic piston in an expanded position in the hydraulic cylinder.

Figure 4 is a side elevational view of the land surface scraper with one wheel removed, and showing the scraper bucket in an operative position with the nose or scraper edge lowered.

Figure 1:
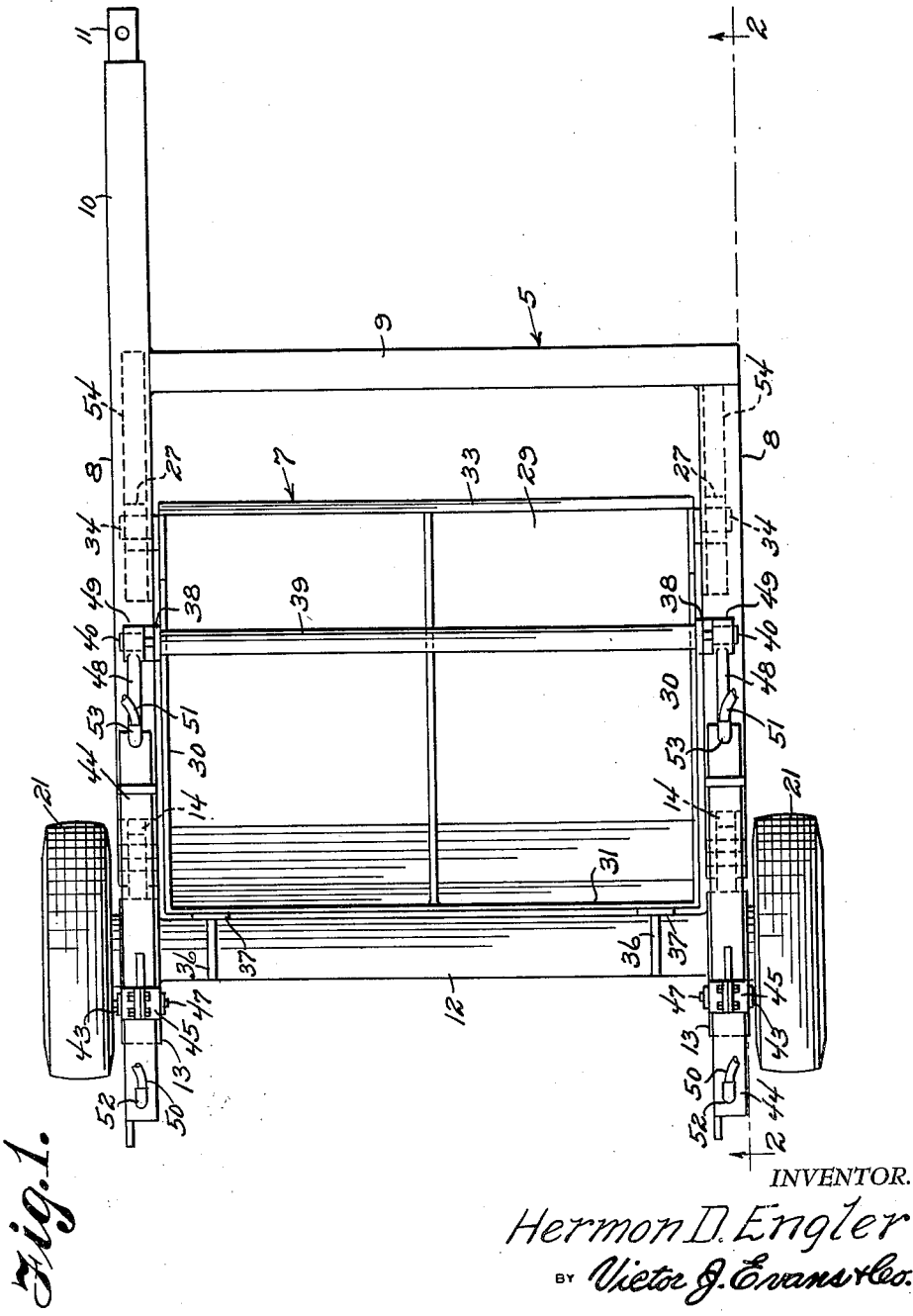
Figure 1 is a top elevational view of the land surface scraper showing the general frame structure arrangement and the manner in which the scraper bucket is rockably mounted between the side members of the frame structure to swing vertically about a horizontal pivot axis.

Figure 5 is a rear elevational view of the land scraper showing the manner in which the hydraulic operating cylinders are mounted one on each side of the scraper bucket, and also showing the supporting means for said hydraulic operating mechanism; and Figure 6 is a fragmentary top plan view of the axle housing and frame connection with the parts exploded to indicate the manner in which the rear portion of the frame structure is pivotally connected to the supporting axle housing.

In the drawings, referring more in detail the land scraper comprises a wheeled frame structure generally designated 5, the rear end of which is supported by means of a truck designated 6. A scraper bucket generally designated 7 is mounted on the frame structure 5 to swing vertically about a horizontal pivot axis. The frame 5 and truck 6 being pivotally connected to allow the pivot axis of the bucket 7 to be lowered and position the bucket so that the scraping edge will be located slightly below the land surface.

The frame structure 5 includes side frame bars 8 of channel section which are connected adjacent their forward ends by means of a transverse frame bar 9, likewise of channel section. One of the frame bars 8 may be extended as at 10 to provide a draft bar, and is shaped to provide a coupling tongue 11 capable of being connected in draft relationship to a tractor vehicle.

The truck frame 6 includes a tubular axle housing 12 having enlarged castings 13 at the ends thereof provided with tongues 14 which are adapted to be received between spaced apart bearing lugs 15 formed integral or welded to the side frame bars 8. A pivot pin 16 is passed through the bearing openings in the tongue 14 and spaced lugs 15 to enable the axle housing 12 to swing relative to the frame 5 as shown in Figure 4. Pivotal swinging movement in a reverse direction is prevented by means of stop members 17 and 18, arranged in cooperating relation and formed integral with the tongues 14 at each end of the axle housing and the spaced apart bearing lugs 15. The bearing lugs or brackets 15 being either formed integral with the side frame members 8 or affixed thereto by welding or the like.

An axle 20 is mounted in the axle housing 12, and has mounted on the ends rubber tired supporting wheels 21. Suitable bearings being provided for the wheels to permit free rolling movement thereof.

In order to hold the axle truck 6 in alignment with the side frame bars 8 of the frame 5, a coil spring 22 is mounted at each side of the frame 5 and has one end connected to a lug 23 affixed to the lower flange of each of the frame bars 8 and the opposite end connected to a downwardly extending projection 24 welded or otherwise affixed to the enlarged portions 13 of the axle housing. The coil spring 22 has its end hooked in an opening 25 in the downwardly extending projection 24 to yieldingly retain the axle truck 6 in horizontal alignment with the frame structure 5. Thus, the stop members 17 are held in engagement with the stop shoulders 18 on the bearing brackets 15.

Depending from the side frame bars 8 is a trunion bracket 27 which is welded or otherwise affixed to the frame structure for pivotally supporting a scraper bucket generally designated 7. The scraper bucket includes a bottom wall 29 having side walls 30 which are connected in the rear by vertical and angular walls 31 and 32 which form a continuation of the bottom wall 29. The forward edge of the bottom wall 29 is beveled as at 33 to provide a relatively sharp scraper edge to level the land surface over which the scraper is traversed. Trunnion pins 34 project laterally from the side walls 30 of the scraper 7, and are received in the bearing openings of the trunnion brackets 27. It is to be noted that the pivot axis 34 of the scraper bucket 7 is located adjacent the beveled scraping edge 33 of said bucket.

Secured to the rear wall 31 of the scraper bucket 7 at each side thereof is a rearwardly extending stop member 36 which has its base 37 welded or otherwise secured to said rear vertical wall 31 so that the lower edge of each stop member will engage the axle housing 12 when the scraper bucket 7 is in its normal position, and limit downward swinging movement of the bucket 7 about the horizontal pivot axis 34.

Secured to each of the side walls 30 of the scraper bucket 7 is a bracket casting 38, the upper ends of which project slightly above the upper edge of the side walls 30 for accommodating a reinforcing bar 39 which has its ends welded or otherwise secured to the bracket castings 38. Laterally extending bearing pins 40 are formed integral with the brackets 38 for a purpose which will be hereinafter more fully described.

Extending upwardly from each of the enlarged portions 13 at the ends of the axle housing 12 is a mounting bracket 42 terminating in a yoke 43 for rockably supporting a hydraulic cylinder 44. The hydraulic cylinder 44 is provided with a split band 45 held in place by retaining bolts 46, and capable of being adjusted so that the cylinder 44 may be moved to a predetermined position and held securely upon tightening the bolts 46. The split band 45 is provided with oppositely extending pins 47 which are received in bearing openings in the yoke arms 43. Thus, the cylinder 44 may rock about the trunnion pins 47 during the vertical swinging movement of the scraper bucket 7 about its horizontal pivot axis 34. Reciprocably mounted in the cylinder 44 is a piston of conventional construction (not shown), to which is affixed a connecting rod 48 having a bearing eye 49 for receiving the bearing pins 40 on the bracket castings 38. It will thus be seen, that a hydraulic operating cylinder is provided at each side of the scraper bucket for swinging the same about its horizontal pivot axis 34.

Pressure fluid from a suitable source is admitted to opposite ends of each cylinder 44 by means of pipe lines 50 and 51 which connect to elbow fittings 52 and 53 at the opposite ends of the cylinder 44. The pipe lines 50 and 51 may extend forwardly along the side frame members 8, and may be coupled by a flexible hose to a suitable control valve adjacent the drivers seat of a tractor vehicle. The pressure source (not shown) may comprise a pump and hydraulic reservoir for selectively pumping pressure fluid through the pipes 50 and 51 to opposite ends of the cylinders 44.

Side guard bars 54 may be welded to the lower flange of the side channel frame members 8 adjacent the scraper edge 33 to prevent the load from overflowing laterally of the scraper bucket and to direct the load therein.

In operation, it will be assumed that the wheeled frame structure 5 is connected in draft relationship with a tractor vehicle, and the pressure fluid lines 50 and 51 are connected to a suitable source of pressure fluid under the control of the operator. Pressure fluid is first admitted to the forward end of each cylinder 44 through the flexible pipe lines 51 to cause the cylinder mounting arms 42 to be urged from the position shown in Figure 2 to the position shown in Figure 4, whereby the enlarged end portions of the axle housing 6 will pivot about the pivot pins 16 against the yielding action of the coil springs 22. In this position, the side frame members 8 are slightly lowered with respect to the rear axle 20 so as to tilt the bucket as shown in Figure 4. The scraper may be traversed over the land surface so that the scraping edge 33 will level the surface and the excess soil will be collected in the scraper bucket 7.

When the bucket 7 becomes loaded, pressure fluid is admitted to the opposite ends of the cylinders 44, which causes the piston rods 48 to be projected and during their initial movement the axle housing 6 will be rocked about the pivot pins 16 until the stop projections 17 engage the stop shoulders 18 on the tongue and bearing brackets 14 and 15 respectively. As this occurs, the frame 5 is elevated slightly and upon continued movement of the piston rods 48, the scraper bucket 7 is swung vertically about the pivot axis 34 by the force applied to the pivot pins 40. When the piston rods 48 have reached the limit of their travel, the bucket 7 will be moved to a dumping position as shown in Figure 3. With the bucket 7 in this position the scraper may be transported from the dumping area to the loading area or moved around as desired. By then again admitting pressure fluid to the forward ends of the cylinders 44 through the flexible pipe lines 51, the scraper bucket 7 will be returned to the position shown in Figure 4.

If it is desired to tilt the scraper bucket 7 to various angular positions, pressure fluid may be admitted to either end of the cylinders 44 until the bucket has reached a predetermined angular position, after which the control valve (not shown) is moved to a neutral position to retain the bucket in its predetermined position, so that dirt in the scraper bucket may be spread over the ground or dumped as desired. By adjusting the position of the cylinders 44 with respect to the mounting brackets 42, the axle housing 6 may be limited to various angular positions of swinging movement about the pivot axis 16, since it will be noted that the piston on the piston rod 48 is limited to sliding movement within the limits of the length of the cylinders 44.

I claim:

A land scraper comprising a frame structure having spaced parallel side bars, a scraper bucket rockably mounted between said frame bars, a wheeled supporting truck pivotally connected to the rear end of said frame structure to permit the frame structure to swing downwardly, a stop on the rear end of each side bar, stops on said supporting truck in alinement with said first stops and said stops arranged so that when the stops on each side bar abuts the stops on the supporting truck said stops will prevent swinging movement of said side bars and said supporting truck about said pivot point in a reverse direction, yielding spring means connecting said frame and truck to urge the same into a straight line position; pressure means carried by the truck and connected to the scraper bucket for rocking the bucket about its pivot axis to swing the same vertically when said pressure means is operated in one direction and upon operation of said pressure means in a reverse direction to cause said frame to swing downwardly about the pivot axis of the truck connection against the yielding action of said coil spring, so that the scraper bucket will be moved to a horizontal or scraping position.

HERMON D. ENGLER.

REFERENCES CITED

The following references are of record in the file of this patent:

UNITED STATES PATENTS

| Number | Name | Date |
|---|---|---|
| 1,714,118 | Armington | May 21, 1929 |
| 1,911,511 | Jordan | May 30, 1933 |
| 1,924,358 | Harrison | Aug. 29, 1933 |
| 1,982,219 | McAlister | Nov. 27, 1934 |